United States Patent [19]
Floessel

[11] 3,778,526
[45] Dec. 11, 1973

[54] INSULATION GAS-FILLED TUBULAR CASING STRUCTURE FOR HIGH-VOLTAGE CONDUCTOR

[75] Inventor: Dieter Floessel, Fislisbach, Switzerland

[73] Assignee: Aktiengesellschaft Brown, Boveri & Cie, Baden, Switzerland

[22] Filed: June 12, 1972

[21] Appl. No.: 261,933

[30] Foreign Application Priority Data
Aug. 4, 1971 Switzerland.................. 11449/71

[52] U.S. Cl.................. 174/13, 174/21 C, 174/28
[51] Int. Cl......................... H02g 15/24, H01b 9/06
[58] Field of Search.............. 174/13, 21 R, 21 C, 174/21 CA, 22 R, 22 C, 23 R, 28, 86, 99 E

[56] References Cited
UNITED STATES PATENTS
3,325,583   6/1967   Frowein.................. 174/23 R X

FOREIGN PATENTS OR APPLICATIONS
706,448   3/1931   France.................. 174/21 C
944,665   11/1948   France.................. 174/21 CA Primary Examiner—Laramie E. Askin
Attorney—Ralph E. Parker et al.

[57] ABSTRACT

A high-voltage electrical conductor is encapsulated within a rectilinear tubular casing comprising a plurality of tubular sections connected together in essentially end-to-end relation by means of a coupling structure that includes telescoped coupling sleeves secured respectively to the end portions of the casing sections and an elastic support insulator through which the conductor passes and is supported centrally within the casing. The support insulator also includes two oppositely directed cup portions the side walls of which adjoin and are secured to the inner surfaces of the coupling sleeves. Being elastic, the cup portions of the insulator yield elastically in association with a corresponding longitudinal movement of the coupling sleeves to accommodate temperature-induced longitudinal expansions and contractions of the metallic casing sections.

5 Claims, 1 Drawing Figure

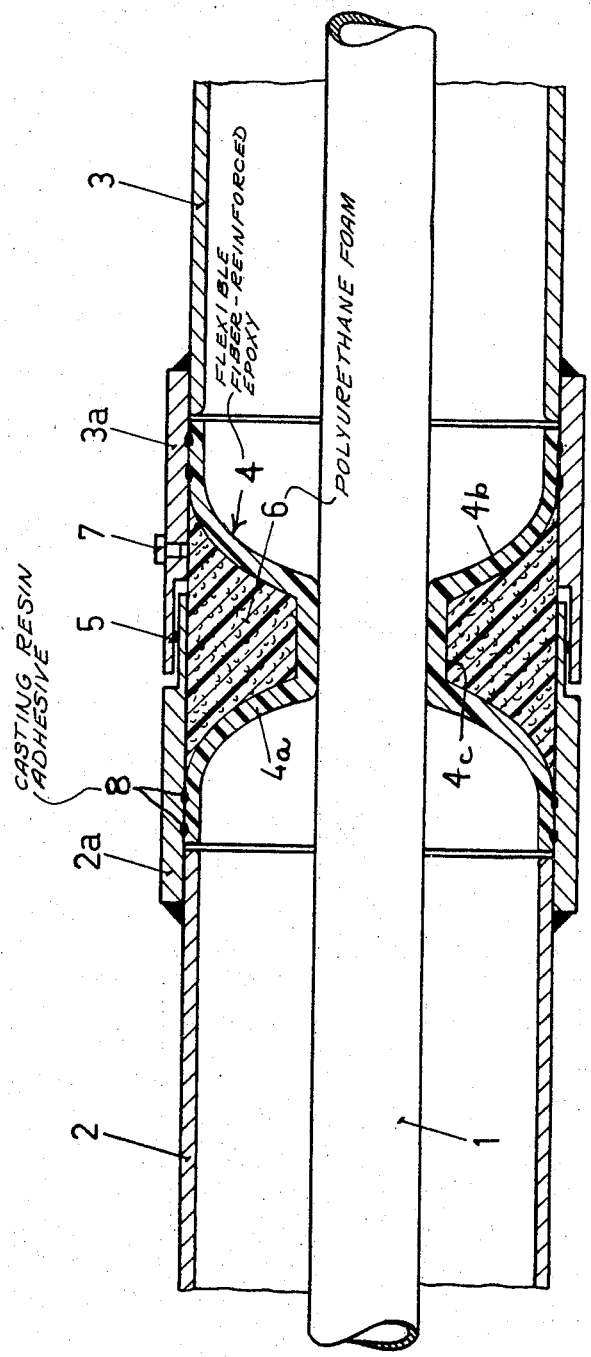

INSULATION GAS-FILLED TUBULAR CASING STRUCTURE FOR HIGH-VOLTAGE CONDUCTOR

The present invention relates to an improvement in the construction of insulation gas-filled tubular casing structures enclosing high-voltage electrical conductors. More particularly the invention concerns an enclosed high-voltage conductor of the general type wherein the conductor is held in place centrally within a tubular, grounded metallic casing by means of supporting insulators therein, and wherein the casing consists of tubular cylindrical sections joined together in essentially end-to-end relation by coupling means including expansion joints to accommodate longitudinal contractions and expasions of the sections under changing temperature.

Enclosed high-voltage conductor structures of the above-mentioned type used as bus-bars and providing expansion joints between adjacent cylindrical casing sections are disclosed, for example, in German patent application No. 1,515,367 which has been opened to the public. The conductor is held in place within the casing by means of tapered insulators, a bellows unit being used at each junction to compensate for any longitudinal expansion of the casing sections. This arrangement is, however, relatively costly and structurally complicated, and especially so because of the bellows unit which is required to have a diameter approximately equal to that of the cylindrical casing.

The objective of the present invention is to provide a more simplified and hence correspondingly less expensive construction for enclosed electrical conductors of the foregoing general type, and is achieved by a novel construction of the conductor supporting insulator provided at each joint between adjacent tubular sections of the enclosing casing which enables it to also function as part of the necessary expansion joint structure.

More particularly, the support insulator, made from an elastic material such as a fiber-reinforced epoxy resin, has a double-cupped configuration consisting of two axially spaced and oppositely directed cup portions separated by a centrally located tubular portion through which the conductor passes. The rims of the cup portions confront the respective ends of the metallic casing sections that are joined together, and the cylindrical side walls of the cup portions adjoin and are secured respectively to the inner surfaces of coupling sleeves secured to the ends of the casing sections and which are telescoped such as to permit longitudinal movement of the coupling sleeves accompanied by a corresponding elastic deformation of the support insulator to accommodate temperature-induced longitudinal expansions and contractions of the metallic casing sections.

The foregoing, as well as other objects and advantages inherent in the invention will become more apparent from the following detailed description of a preferred embodiment of the invention and which is illustrated in the accompanying drawing, the single view presented being a longitudinal diametral section through the end portions of adjacent joined-together sections of the rectilinear tubular casing enclosing the electrical conductor centrally therein.

With reference now to the drawing, it will be seen that the rectilinear high-voltage electrical conductor 1 has a cylindrical configuration and is located centrally within a grounded metallic cylindrical casing constituted by a number of sections such as the two sections 2 and 3 depicted which are joined together at their ends by coupling structure. The couplng structure comprises a coupling sleeve 2a surrounding and welded to and projecting beyond the end of casing section 2, and a similar coupling sleeve 3a secured to and projecting beyond the end of casing section 3. The ends of the coupling sleeves 2a, 3a have different diameters so as to enable them to be overlapped in a loose telescoping arrangement providing an annular gap therebetween which allows longitudinal expansion and contraction of the casing sections 2 and 3 to take place under changing heat conditions. The annular gap between the telescoped portions of the coupling sleeves is sealed with a sealing ring 5 to exclude entry of moisture, and other foreign matter. The casing sections 2, 3 and the coupling sleeves 2a, 3a are metallic and can be made of aluminum.

Located within the coupling sleeve structure 2a–3a and bridging the telescoped ends of the two sleeves is the novel dual function insulator 4 in accordance with the principal concept of the invention. As seen from the drawing, insulator 4 has a double-cupped configuration consisting of two axially spaced cup portions 4a, 4b separated by a cylindrical tubular portion 4c. The cup portions 4a and 4b are oppositely directed and the outer rims thereof respectively confront the ends of the casing sections 2 and 3. The side walls of the cup portions are cylindrical and have an outer diameter substantially equal to the inner diameter of the coupling sleeves 2a, 3a. These cylindrical side walls of the cup portions are provided with two axially spaced circular grooves in alignment with corresponding grooves provided on the inner surfaces of the coupling sleeves, and these grooves are filled with rings of casting resin 8 which serve to secure the insulator structure 4 to the coupling sleeves 2a, 3a and also establish a seal preventing any possibility of leakage of the gas filling from the casing. The inner diameter of the tubular portion 4c of the insulator is essentially the same as the outer diameter of the high-voltage conductor 1 which passes through it and hence serves to support the conductor centrally within the casing sections 2 and 3.

The insulator structure 4 is made from a plastic insulating material which is reinforced by fibers. One suitable material is an epoxy resin reinforced with glass or polyester fibers. The walls of the cup portions 4a, 4b are maintained relatively thin so as to enable them to elastically deform in response to longitudinal movements of the telescoped coupling sleeves 2a, 3a under changing temperature conditions. The space bounded by the cup portions 4a, 4b and the coupling sleeves 2a, 3a is filled with an insulation 6 such as polyurethane foam to achieve desired dielectrical properties. A fill-opening provided with a closure plug 7 is included in the structure of coupling sleeve 3a to permit insertion of the foam 6 after the coupling between adjacent sections 2 and 3 of the casing has been completed. The interior of the casing 2, 3 is filled with an insulation gas, e.g., $SF_6$ which is pressurized to any suitable pressure such as for example 4 atmospheres.

I claim:

1. An encapsulated insulation gas-filled high-voltage electrical conductor structure comprising a rectilinear conductor enclosed within a rectilinear tubular metallic casing composed of a plurality of tubular sections connected together in essentially end-to-end relation by coupling means located respectively at the junctions between the connected sections, said coupling means including telescoped and longitudinally slidable coupling sleeves secured respectively to the end portions of said casing sections, an elastic support insulator including a central tubular portion through which said conductor passes and is supported within said casing and two oppositely directed cup portions the side walls of which adjoin and are secured respectively to the inner surfaces of said coupling sleeves, said cup portions being yieldable elastically in association with a corresponding longitudinal movement of said telescoped coupling sleeves to accommodate temperature-induced longitudinal expansion and contraction of said casing sections, and an insulating foam filling the space bounded by said cup and tubular portions of said support insulation and said coupling sleeves.

2. An encapsulated insulation gas filled high-voltage electrical conductor structure as defined in claim 1 wherein said insulating foam is made of polyurethane.

3. An encapsulated insulation gas filled high-voltage electrical conductor structure as defined in claim 1 wherein said support insulator is made from a fiber-reinforced insulating plastic.

4. An encapsulated insulation gas filled high-voltage electrical conductor structure as defined in claim 3 wherein an epoxy resin serves as the insulating plastic from which said support insulator is made.

5. An encapsulated insulation gas filled high-voltage electrical conductor structure as defined in claim 1 wherein a ring seal is provided between the telescoped portions of said coupling sleeve and wherein the side walls of said cup portions and the adjoining inner surfaces of said coupling sleeves are provided with confronting circular grooves filled with a casting resin thereby to provide the connection between said support insulator and said coupling sleeves.

* * * * *

UNITED STATES PATENT OFFICE
CERTIFICATE OF CORRECTION

Patent No. 3,778,526      Dated December 11, 1973

Inventor(s) Dieter Floessel

It is certified that error appears in the above-identified patent and that said Letters Patent are hereby corrected as shown below:

Claim 2, line 2, insert the numeral

"1" after "claim"

Signed and sealed this 23rd day of April 1974.

(SEAL)
Attest:

EDWARD M. FLETCHER, JR.
Attesting Officer

C. MARSHALL DANN
Commissioner of Patents